Jan. 23, 1962   R. A. BAUDRY ET AL   3,018,144
THRUST BEARING ASSEMBLY
Filed Feb. 29, 1960   3 Sheets-Sheet 3

United States Patent Office 3,018,144
Patented Jan. 23, 1962

3,018,144
THRUST BEARING ASSEMBLY
Rene A. Baudry, Pittsburgh, and Eugene C. Whitney, Forest Hills, Pa., assignors to Westinghouse Electric Corporation, East Pittsburgh, Pa., a corporation of Pennsylvania
Filed Feb. 29, 1960, Ser. No. 11,674
8 Claims. (Cl. 308—160)

The present invention relates to thrust bearing assemblies for vertical shafts, and more particularly to large thrust bearings of the pivoted pad type.

Large thrust bearings for the vertical shafts of machines such as water wheel generators are usually of the type in which a thrust runner on the shaft is supported on a plurality of segmental bearing pads which are pivotally mounted to permit the pads to tilt slightly to establish a wedge-shaped oil film. In bearings of this type, it is desirable to support the bearing pads in such a way that the load is distributed as uniformly as possible over the surface of the pad. This is especially necessary during the starting period, before the oil film is established, in order to avoid high peak pressures in limited areas of the pad which may cause damage to the bearing surface. Uniform distribution of the load is also desirable, during both starting and running, in order to prevent or minimize distortion of the pad.

In very small thrust bearings, concentrated supports for the bearing pads can be used, but in larger bearings the concentrated support causes a high concentration of load which is undesirable and sometimes not permissible. In these bearings, therefore, the bearing pads must be supported on their pivots in a manner which distributes the load more uniformly so as to reduce the peak pressures. Disk type supports have been used for this purpose with satisfactory results, but as the size of the bearing increases, it becomes increasingly difficult to obtain sufficiently uniform distribution of load with this type of support. Multiple supports, in which the bearing pad is supported at a plurality of points distributed over its area, have been proposed for large bearings but such supports have not heretofore been practical because of the difficulty of manufacturing them with sufficient accuracy to obtain the desired results. The constructions which have been proposed for this type of support have required extremely accurate manufacturing and hand fitting and have not proved to be practical for actual use.

The principal object of the present invention is to provide a thrust bearing assembly of the pivoted pad type in which the bearing pads are supported on the pivots in a manner which provides substantially uniform distribution of load over the surface of the pad.

Another object of the invention is to provide a thrust bearing assembly in which the bearing pads are supported on their pivots by a relatively simple load equalizing support structure which permits control of the load distribution over the surface of the bearing to obtain the desired degree of uniformity.

A further object of the invention is to provide a thrust bearing assembly in which the bearing pads are supported at a plurality of points distributed over the area of the pads, and in which the supporting structure is relatively simple to manufacture and requires no difficult or expensive hand fitting to obtain the required accuracy.

Other objects and advantages of the invention will be apparent from the following detailed description, taken in connection with the accompanying drawings, in which.

Figure 1:
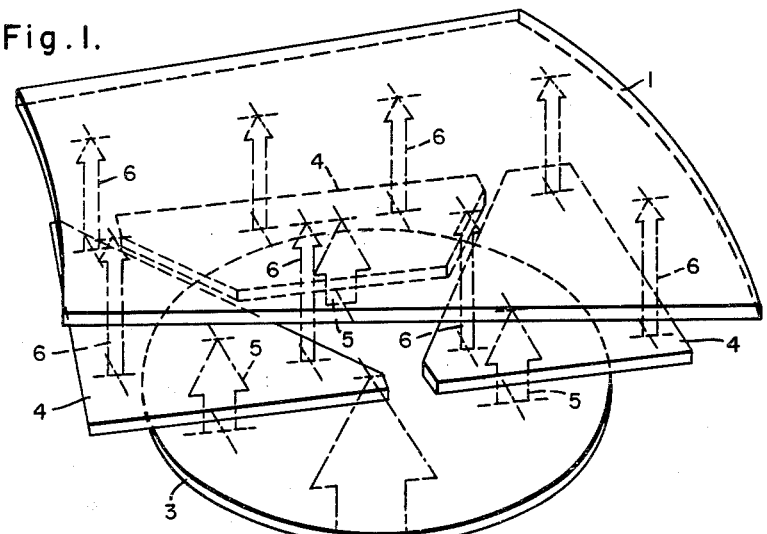
FIGURE 1 is a diagrammatic perspective view of a single bearing pad and its support illustrating the principles of the invention.

The principles of the invention are illustrated by the diagrammatic perspective view of FIG. 1. This figure shows a structure for supporting a segmental bearing pad 1 on a pivot represented by the arrow 2. It will be understood, of course, that a complete bearing would include a plurality of bearing pads 1 arranged in a circle to engage a thrust runner on a shaft, each of the pads 1 being supported on its own pivot 2.

In order to obtain the desired distribution of the load on the bearing pad 1, the pad is supported on the pivot 2 by a supporting structure which includes a lower support member or plate 3 resting directly on the pivot. Three intermediate support members or plates 4 are provided and each of these intermediate support members is supported at a single point by a suitable support, represented by an arrow 5, resting on the lower support member 3. A plurality of bearing pad supports represented by arrows 6 rests on each of the intermediate support members 4. Any suitable number of supports 6 could be used but in the illustrated embodiment, there are three such supports on two of the intermediate support members 4 and two supports 6 on the third of the intermediate support members. The supports 6 are arranged as shown in two generally parallel rows, and the bearing pad 1 rests directly on the support 6. The lower support member 3 is disposed so that it rests on the pivot 2 at substantially the center of gravity of the three loads represented by the supports 5. Each of the intermediate support members 4 is arranged so that it rests on its support 5 substantially at the center of gravity of the loads represented by the supports 6. Thus, the entire supporting structure is balanced and the loading is always statically determined by the geometry of the structure.

The bearing pad 1 is thus supported on the pivot 2 by a mechanically stable, balanced supporting structure, and the entire structure can tilt about the pivot 2 to the limited degree necessary to establish a wedge-shaped oil film between the surface of the pad 1 and the thrust runner which it engages. It will be seen that a relatively simple structure is provided, and that the bearing pad 1 is supported at a plurality of points distributed throughout its area so that the load distribution over the surface of the bearing pad can easily be controlled and made to have the desired degree of uniformity. Thus, high peak loads, or excessive local concentrations of load on the bearing pad, are eliminated and distortion of the pad due to non-uniform loading or to thermal gradients is minimized without having to increase the rigidity of the pad by making it undesirably thick. The supporting structure is relatively simple, so that it can easily be manufactured and no difficult and expensive hand fitting is required, since the arrangement of the supporting structure lends itself readily to relatively simple mechanical design.

Figure 2:
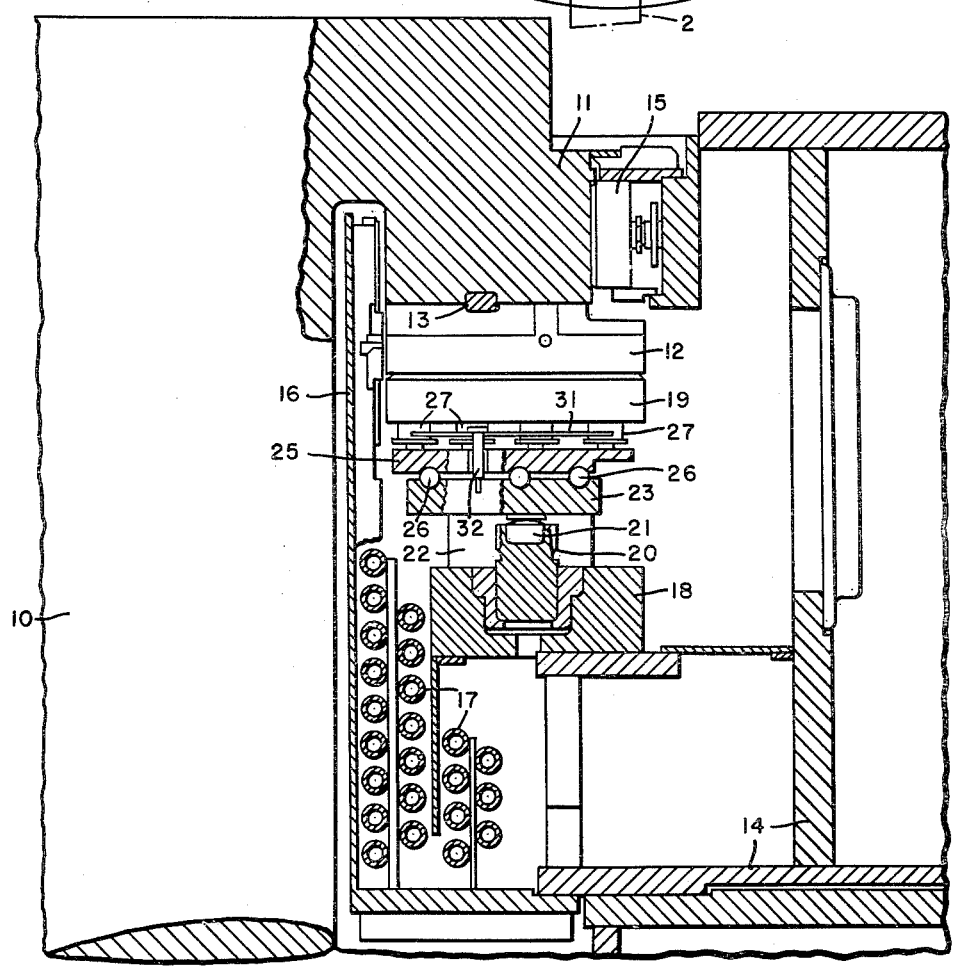
FIG. 2 is a vertical sectional view of a large thrust bearing embodying the invention.

FIGS. 2 through 6 show a preferred embodiment of the invention in an actual large thrust bearing, although it will be understood that the principles of the invention, as described above in connection with FIG. 1, might equally well be embodied in other structures. FIG. 2 shows a vertical sectional view of a large thrust bearing for supporting a vertical shaft 10, which may for example be the shaft of a large water wheel generator and which is adapted to be connected at its upper end to the rotor of the generator. The shaft 10 carries a thrust block 11 which may be integral with the shaft as shown and has an annular thrust runner 12 secured to the thrust block 11 by a key 13, or in any other suitable manner, to rotate with the shaft.

The bearing may be supported in a supporting and enclosing structure 14 of any suitable type which rests on a foundation and which may also support the stator of the generator (not shown). Guide bearing shoes 15 may also be mounted on the structure 14 to engage a guide bearing surface on the thrust block 11. A stand-pipe 16 is mounted on the supporting structure 14 surrounding the shaft to form an annular oil chamber around the bearing which is normally filled with oil for lubricating the bearing. Oil cooling coils 17 of any suitable type are preferably also provided for removing heat from the oil.

Figure 3:
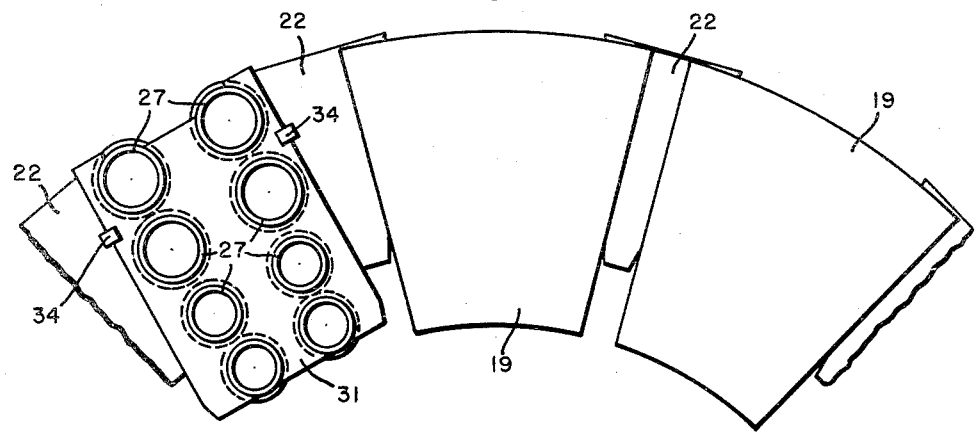
FIG. 3 is a partial plan view of the thrust bearing assembly with one of the bearing pads removed.

The bearing support proper may be an annular member 18 carried on the supporting structure 14 and extending completely around the shaft. The bearing is of the pivoted pad type, as previously described, and includes a plurality of segmental bearing pads 19 mounted for slight tilting movement on pivots 20, a suitable number of bearing pads being provided as indicated in FIG. 3. The pivot 20 for each bearing pad is carried on the bearing support 18 and is preferably threaded in the bearing support to permit individual adjustment of the pivots 20 to equalize the load between the pads. The pivot 20 preferably has a hardened steel insert 21 to carry the weight of the bearing and the load imposed on the bearing by the shaft 10. The annular bearing support 18 also has a plurality of generally sector-shaped vertical projections 22 extending upwards between the pivots 20 in position to prevent rotation of the bearing pads due to friction during starting.

Figure 4:
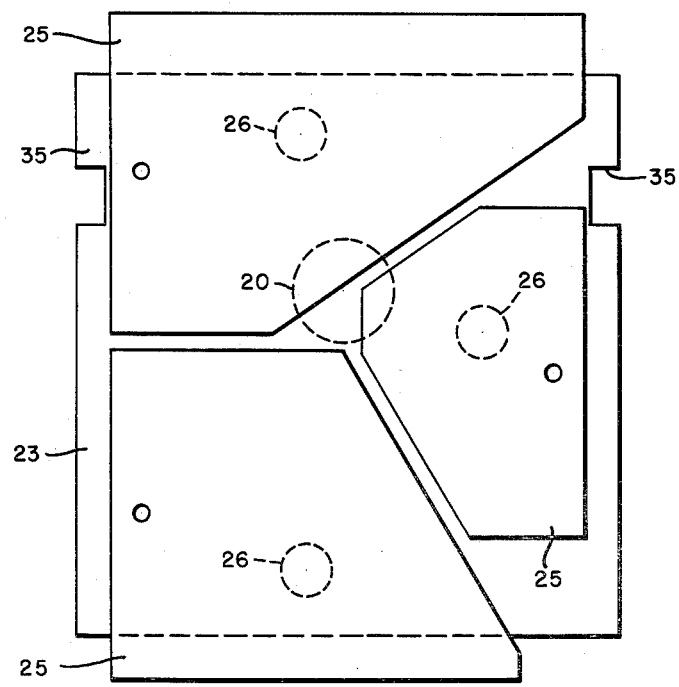
FIG. 4 is a plan view of a bearing pad supporting structure with the upper supporting elements removed.

Each of the bearing pads 19 is supported on its pivot 20 by a load equalizing supporting structure of the type shown diagrammatically in FIG. 1. The supporting structure includes a lower support member 23 which may be a steel plate of generally rectangular shape resting directly on the pivot 20. The lower support member 23 preferably has a hardened steel insert 24 in its lower surface which engages the insert 21 of the pivot 20. Three intermediate support members 25 are provided. These support members 25 may also be made of steel plate and are preferably shaped substantially as shown in FIG. 4 so that they can be independently supported on the lower support member 23. Each of the intermediate support members 25 is supported on the lower support member 23 at a single point by means of a suitable bearing element, shown as a hardened steel ball 26 engaging in corresponding recesses in the members 23 and 25.

Figure 5:
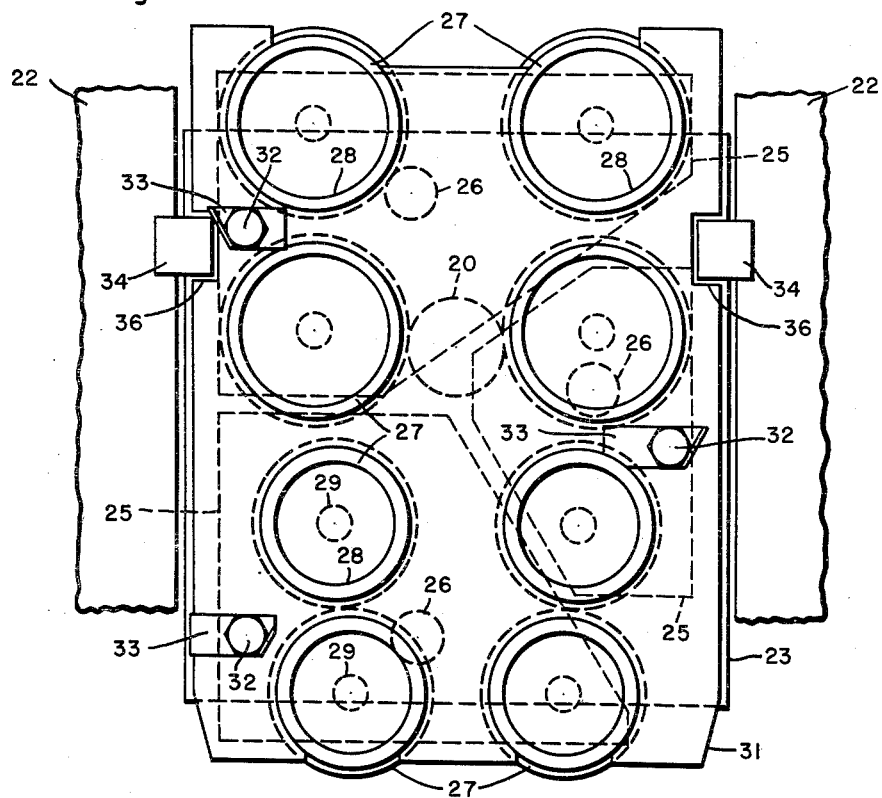
FIG. 5 is a plan view of the fully assembled bearing pad supporting structure.
Figure 6:
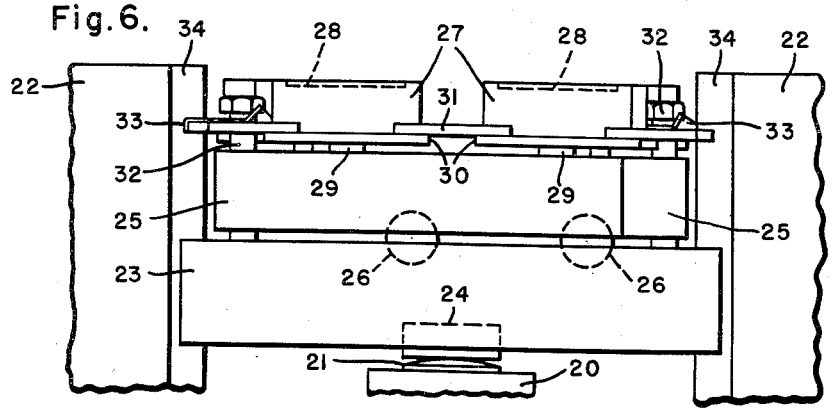
FIG. 6 is an end view of the bearing pad supporting structure.

A plurality of circular supports 27 rests on each of the intermediate support members 25. In the illustrated embodiment, three supports 27 are provided on each of two of the support members 25 and two supports 27 on the third support member 25, the supports 27 being arranged in two rows of four each, as shown in FIGS. 3 and 5. The supports 27 are circular in shape and each support 27 preferably has an annular bearing surface 28 on which the bearing pad 19 rests. Each of the supports 27 has a lower stem portion 29 of reduced diameter which rests on the intermediate support 25, and has a flange 30 of larger diameter than the body of the support 27.

The supports 27 are retained in their predetermined positions on the intermediate supports 25 by means of a retainer plate 31. The plate 31 is generally rectangular and has openings in it adapted to receive the supports 27, the plate 31 resting on the flanges 30 of the supports. The plate 31 thus positions the supports 27 relative to each other, and the plate 31 is positioned and held in place by three studs 32 which pass through holes in the plate and through suitable openings in the intermediate supports 25, with a small clearance, and are threaded into the lower support member 23. The studs 32 are tightened sufficiently to hold the plate 31 in place and are held in place by lock plates 33 of any suitable type.

The entire supporting structure is retained in position by vertical keys 34 which are rigidly secured in the vertical projections 22 of the bearing support 18 and which engage notches 35 formed in the lower support member 23 and notches 36 formed in the retainer plate 31. The keys have a small clearance in the notches 35 and 36 to permit the necessary limited tilting of the entire assembly on the pivot 20. The bearing pad 19 rests directly on the supports 27, as shown in FIG. 2, in position to engage the thrust runner 12 on the shaft.

The lower support member 23 is positioned with respect to the pivot 20, by means of the keys 34, so that it rests on the pivot at a predetermined position which may be substantially at the center of gravity of the three intermediate support members which are carried by the lower support member, or which may be chosen to obtain a desired optimum load distribution on the bearing pad. Similarly, the supports 27 are positioned on the intermediate supports 25, and the bearing members 26 are positioned with respect to the intermediate supports 25, in such a manner that the bearing member 26 of each intermediate member 25 is located at a position which may be substantially at the center of gravity of the supports 27 carried by the intermediate support, or which may be located for optimum load distribution. Thus, as explained above in connection with FIG. 1, the entire supporting structure is mechanically stable and the loading is statically determined by the geometry of the structure. The desired distribution of load over the surface of the bearing pad is therefore readily obtained by proper design of the bearing support.

It will be seen that the supporting structure described above is a relatively simple mechanical structure which can readily be manufactured with the desired accuracy, since the proper location of the various points of support can readily be determined. Thus, no difficult manufacturing problems are involved and no difficult and expensive hand fitting is required since the parts can easily be manufactured with the necessary accuracy and easily assembled. A supporting structure for the thrust bearing pad is thus provided which supports the pad at a plurality of points distributed throughout its area to obtain the desired distribution of load on the bearing pad, but without the disadvantages of the types of multiple pad supports which have previously been proposed and which were impractical for actual use because of the manufacturing difficulties involved and the difficult hand fitting required.

It should now be apparent that a thrust bearing assembly has been provided for large vertical thrust bearings which makes it possible to obtain a desired distribution of load on the bearing pad, thus avoiding excessive peak loads in local areas of the bearing, and that this result is obtained by means of a relatively simple mechanical structure which can readily be manufactured and assembled. A particular embodiment of the invention has been shown and described for the purpose of illustration but it will be understood that the principles of the invention are capable of embodiment in other structures and that all equivalent embodiments and modifications are within the scope of the invention.

We claim as our invention:

1. A thrust bearing assembly for a vertical shaft having a rotating thrust runner thereon, said bearing assembly comprising a plurality of segmental bearing pads having bearing surfaces for engaging the thrust runner, a stationary pivot member for each bearing pad, support means for individually supporting each bearing pad on its pivot, each of said support means including a lower support member resting on the pivot, a plurality of intermediate support members each supported, at one point on the lower support member, and a plurality of supports resting on each of the intermediate support members for supporting the bearing pad thereon.

2. A thrust bearing assembly for a vertical shaft having a rotating thrust runner thereon, said bearing assembly comprising a plurality of segmental bearing pads having bearing surfaces for engaging the thrust runner, a stationary pivot member for each bearing pad, support means for individually supporting each bearing pad on its pivot, each of said support means including a lower support member resting on the pivot, a plurality of intermediate support members each supported at one point on the lower support member, and a plurality of supports resting on each of the intermediate support members for supporting the bearing pad thereon, the lower support member resting on the pivot substantially at the center of gravity of the intermediate support members and the point of support of each of the intermediate support members being substantially at the center of gravity of the supports carried thereby.

3. A thrust bearing assembly for a vertical shaft having a rotating thrust runner thereon, said bearing assembly comprising a plurality of segmental bearing pads having bearing surfaces for engaging the thrust runner, a stationary pivot member for each bearing pad, support means for individually supporting each bearing pad on its pivot, each of said support means including a lower support member resting on the pivot, a plurality of intermediate support members, a single bearing element between each intermediate support member and the lower support member for supporting the intermediate support member, a plurality of supports for the bearing pad resting on each of the intermediate support members, and means for retaining said supports in predetermined positions.

4. A thrust bearing assembly for a vertical shaft having a rotating thrust runner thereon, said bearing assembly comprising a plurality of segmental bearing pads having surfaces for engaging the thrust runner, a stationary pivot member for each bearing pad, support means for individually supporting each bearing pad on its pivot, each of said support means including a lower support member resting on the pivot, a plurality of intermediate support members, a single bearing element between each intermediate support member and the lower support member for supporting the intermediate support members, a plurality of supports for the bearing pad resting on each of the intermediate support members, and means for retaining said supports in predetermined positions, the lower support member resting on the pivot substantially at the center of gravity of the intermediate support members and the point of support of each of the intermediate support members being substantially at the center of gravity of the supports carried thereby.

5. A thrust bearing assembly for a vertical shaft having a thrust runner thereon, said assembly comprising a supporting structure, a plurality of stationary pivot members on the supporting structure, an individual lower support member resting on each pivot member, a plurality of intermediate support members on each of said lower support members, each intermediate support member being supported at one point on the lower support member, a plurality of supports resting on each of the intermediate support members, and a bearing pad resting on the supports associated with each pivot member, said bearing pads having bearing surfaces for engaging the thrust runner.

6. A thrust bearing assembly for a vertical shaft having a thrust runner thereon, said assembly comprising a supporting structure, a plurality of stationary pivot members on the supporting structure, an individual lower support member resting on each pivot member, a plurality of intermediate support members on each of said lower support members, each intermediate support member being supported at one point on the lower support member, a plurality of supports resting on each of the intermediate support members, and a bearing pad resting on the supports associated with each pivot member, said bearing pads having bearing surfaces for engaging the thrust runner, each of the lower support members resting on its pivot member substantially at the center of gravity of the intermediate support members carried thereby and the point of support of each of the intermediate support members being substantially at the center of gravity of the supports carried thereby.

7. A thrust bearing assembly for a vertical shaft having a thrust runner thereon, said assembly comprising a supporting structure, a plurality of stationary pivot members on the supporting structure, a lower support member resting on each pivot member, three intermediate support members on each of said lower support members, a single bearing element between each intermediate support member and its lower support member for supporting the intermediate support member on the lower support member, a plurality of supports resting on each of the intermediate support members, a retainer member carried on each lower support member and engaging said supports to retain them in predetermined positions on the intermediate support members, and a bearing pad resting on the supports associated with each pivot member, said bearing pads having bearing surfaces for engaging the thrust runner.

8. A thrust bearing assembly for a vertical shaft having a thrust runner thereon, said assembly comprising a supporting structure, a plurality of stationary pivot members on the supporting structure, a lower support member resting on each pivot member, three intermediate support members on each of said lower support members, a single bearing element between each intermediate support member and its lower support member for supporting the intermediate support member on the lower support member, a plurality of supports resting on each of the intermediate support members, a retainer member carried on each lower support member and engaging said supports to retain them in predetermined positions on the intermediate support members, and a bearing pad resting on the supports associated with each pivot member, said bearing pads having bearing surfaces for engaging the thrust runner, each of the lower support members resting on its pivot member substantially at the center of gravity of the intermediate support members carried thereby and the point of support of each of the intermediate support members being substantially at the center of gravity of the supports carried thereby.

References Cited in the file of this patent
FOREIGN PATENTS
487,677    Germany _____ Dec. 13, 1929